United States Patent [19]

Tognazzini

[11] Patent Number: 5,708,478
[45] Date of Patent: Jan. 13, 1998

[54] COMPUTER SYSTEM FOR ENABLING RADIO LISTENERS/TELEVISION WATCHERS TO OBTAIN ADVERTISING INFORMATION

[75] Inventor: Bruce Tognazzini, Woodside, Calif.

[73] Assignee: Sun Microsystems, Inc., Mountain View, Calif.

[21] Appl. No.: 670,903

[22] Filed: Jun. 26, 1996

[51] Int. Cl.[6] .................................................... H04N 7/10
[52] U.S. Cl. .................. 348/552; 348/6; 348/10; 348/12; 455/5.1; 455/6.3; 455/4.2
[58] Field of Search ............................... 348/6, 7, 12, 13, 348/10, 552; 455/4.2, 3.1, 5.1, 6.1, 6.2, 6.3; 395/200.09; H04N 7/10

[56] References Cited

U.S. PATENT DOCUMENTS 5,077,607 12/1991 Johnson ........................................ 348/6
5,561,709 10/1996 Remillard ...................................... 348/6
5,600,364 2/1997 Hendricks ...................................... 348/1

Primary Examiner—Sherrie Hsia
Attorney, Agent, or Firm—Lowe, Price, LeBlanc & Becker

[57] ABSTRACT

A computer implemented method captures advertiser information received from an audio or video signal. The method includes the steps of receiving an incoming video or audio signal, determining whether the incoming video or audio signal includes advertisement specific data of an advertiser, and capturing and storing the advertiser specific data. The method also includes the steps of selectively performing, responsive to the request of a user, at least one of the following steps: printing the advertiser specific data including current and previous advertiser specific data upon request; displaying the advertiser specific data including current and previous advertiser specific data upon request; obtaining an advertiser destination number from the advertiser specific data and automatically attempting to establish voice connection with the advertiser upon request; providing directions to an advertiser location; and determining a geographically preferred advertiser.

12 Claims, 8 Drawing Sheets

COMPUTER SYSTEM FOR ENABLING RADIO LISTENERS/TELEVISION WATCHERS TO OBTAIN ADVERTISING INFORMATION

BACKGROUND OF THE INVENTION

1. Field of the Invention

The present invention relates generally to television and radio accessories, and more particularly to television and radio accessories that capture and display/print/utilize advertising information received therefrom.

2. Description of Related Art

In general, television and radio devices are used to transmit entertainment and other information to the viewer or listener. Listeners and watchers of radio and television media are able to receive such information freely. That is, a substantial portion of television media and substantially all radio media are transmitted to the public at no cost via public radio stations and public television stations. To support the transmission of public radio and public television, the radio and television stations sell small blocks of time to businesses for advertising purposes. Businesses then advertise their potential or capabilities for supplying goods and/or services to the public with the hope that the cost of the advertising will be minimal with respect to their ability to attract a larger customer base via the radio listeners and television viewers.

Since radio and television stations are in vigorous competition with one another, generally, the cost of advertising is proportional with respect to the scale or number of listeners/viewers. Thus, when an advertiser is interested in marketing a large listening/viewing audience, the cost of the advertising becomes quite expensive. Most people are familiar with the high cost of advertising during the National Football League (NFL) Super Bowl which can cost over a million dollars for only one minute of commercial time.

To maximize an advertiser's usage of radio and/or television advertising time, advertisers attempt to convey the most meaningful information in the shortest period of time while still maintaining the integrity or substantive content of the advertisement. For example, many advertisers utilize telephone numbers that spell words in accordance with the number/letter designation scheme on an ordinary telephone. The advertisers utilize these special types of telephone numbers to minimize the number of times they are required to repeat the telephone number in the advertisement for the listener to remember. Using this numbering scheme provides additional time so that advertisement might include additional non-cumulative information.

Similarly, in today's mobile environment, advertisers also attempt to convey messages or advertisements to the listening and/or viewing audience in a manner such that the audience is able to remember the advertisement and consider purchasing the goods/services promoted thereby at a later time. Thus, advertisers tend to utilize advertisements that are simple so to facilitate the audience remembering the advertisement and considering the same at a later time.

Problems

However, advertisers have been ignoring the fundamental problem and goal associated with advertising to today's mobile audience. For example, advertisers tend to insert in the advertisements various information which might be required under current broadcast regulations, but which is of little or no interest to the audience from an advertising prospective. In fact, many times advertisers include disclaimers which are unintelligible to the layman, and which ultimately do not affect a consumer's decision whether to purchase the product/service.

Accordingly, it is desirable to provide a listening and/or viewing audience with advertising information which will allow the audience to remember the advertising information to purchase the product/service. It is further desirable to provide a computer system which assists the listener or viewer with remembering the advertising information in a convenient and efficient manner.

The prior art does not provide the radio listener or television viewer with the ability to store and/or convey the advertising information in a manner that allows the viewer or listener to review the advertising information at a time more convenient.

SUMMARY OF THE INVENTION

It is a feature and advantage of the present invention to provide a computer system for enabling radio listeners and television viewers to utilize advertising information at a time subsequent to when such information is broadcast.

It is another feature and advantage of the present invention to provide a computer system for enabling radio listeners and television viewers to print and/or display the advertising information subsequent to when such information is broadcast.

It is another feature and advantage of the present invention to permit the radio listener and/or television viewer to access previous advertisements that have already been broadcast to the listener/viewer.

It is another feature and advantage of the present invention to provide the listener and/or viewer with the ability to automatically contact the advertiser upon identification of an advertisement of interest to obtain additional information regarding the advertisement.

It is another feature and advantage of the present invention to provide the listener and/or viewer with the ability to determine the location of a desired advertiser to travel thereto to obtain additional information and/or purchase the offered product/service.

It is another feature and advantage of the present invention to select the most appropriate advertiser for the viewer and/or listener to obtain/purchase the offered product/service when multiple advertisers are responsible for or support the specific advertisement.

The present invention is based, in part, on the discovery or identification of the problem(s) associated in today's mobile environment. In particular, the present invention is based on the discovery that listeners and/or viewers may opportunistically receive the advertising information and selectively store, print or display same at a later time which is more convenient for the listener or viewer.

In accordance with the invention, existing signals which transmit the advertising information can be modified to include additional information to facilitate the use of the advertising information at a later time. This is accomplished by capturing the advertising information in a manner that permits the information to be used at such a later time.

In accordance with a computer system for enabling radio listeners and/or television viewers to print advertising information, the basic system includes a radio or television coupled to a small printer via a computer. The printer is preferably on the order of a miniature printer used, for example, by taxi drivers and the like for printing receipts. According to a particular operation in an automobile, a driver who listens to an advertisement of interest is provided with a button or switch that delivers to the driver a printout of the product name which is the subject of the advertisement, a brief description of the product, and the name and phone number of the manufacturer or dealer. The data to be printed for the benefit of the driver could be transmitted on a subcarrier of a frequency modulated (FM) signal, on a vertical retrace of a television signal, or on a series of low frequency tones utilized in a main amplitude modulated (AM) signal.

Depending on the amount of data that is to be transmitted, advertisers such as automobile dealers that crowd the airwaves with unintelligible disclaimers could be required instead to send disclaimers to the printing device, thereby alleviating the listener and/or viewer of receiving unnecessary or meaningless information with respect to the decision-making process whether to purchase the offered product and/or service. Further, radios and televisions could also be equipped with a separate display that could be used to display this information captured by the computer system thereon. The user interface typically includes a minimum of two buttons/switches. A first switch designated as "print this ad," allows the viewer/listener to print the current advertisement. A second button/switch designated by "print the previous ad," permits the advertiser/viewer to print the previous advertisements stored in the computer. Thus, users would be able to retrieve the stored advertising information once reaching a particular destination.

In addition, the advertising information could be used to activate and automatically place a call to the advertiser via, for example, the mobile user's cellular telephone or a telephone nearby associated with the listener or viewer. Similarly, the computer system could also determine the nearest advertiser offering the product/service to the viewer and/or listener and then provide a detailed map instructing the viewer and/or listener how to travel to the selected advertiser.

To achieve these features and advantages, the present invention provides a computer architecture used to enable radio listeners and television viewers to obtain advertising information at a time subsequent to when such information is broadcast to the listener/viewer. According to one design, the computer architecture includes an input device detector and decoder processor that receives an incoming video or audio signal, and determines whether the incoming video or audio signal includes advertisement specific data of an advertiser. The computer architecture also includes a data processor, operatively coupled to the input device detector and decoder processor. The data processor captures and storing the advertiser specific data. In addition, the computer architecture includes optionally a printer connected to the data processor, a display connected to the data processor, a user positioning system connected to the data processor, and a telephone connected to the data processor. The data processor selectively performs, responsive to the request of a user, at least one of the following functions: printing the advertiser specific data on the printer including current and previous advertiser specific data upon request; displaying the advertiser specific data on the display including current and previous advertiser specific data upon request; obtaining an advertiser destination number from the advertiser specific data and automatically attempting to establish voice connection with the advertiser upon request using the telephone; providing directions to an advertiser location; and/or determining a geographically preferred advertiser.

In another embodiment, a computer implemented method is provided that captures advertiser information received from an audio or video signal. The method includes the steps of receiving an incoming video or audio signal, determining whether the incoming video or audio signal includes advertisement specific data of an advertiser, and capturing and storing the advertiser specific data. The method also includes the steps of selectively performing, responsive to the request of a user, at least one of the following steps: printing the advertiser specific data including current and previous advertiser specific data upon request; displaying the advertiser specific data including current and previous advertiser specific data upon request; obtaining an advertiser destination number from the advertiser specific data and automatically attempting to establish voice connection with the advertiser upon request; providing directions to an advertiser location; and determining a geographically preferred advertiser.

These, together with other objects and advantages which will be subsequently apparent, reside in the details of construction and operation as more fully hereinafter described and claimed, with reference being had to the accompanying drawings forming a part hereof, wherein like numerals refer to like elements throughout.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
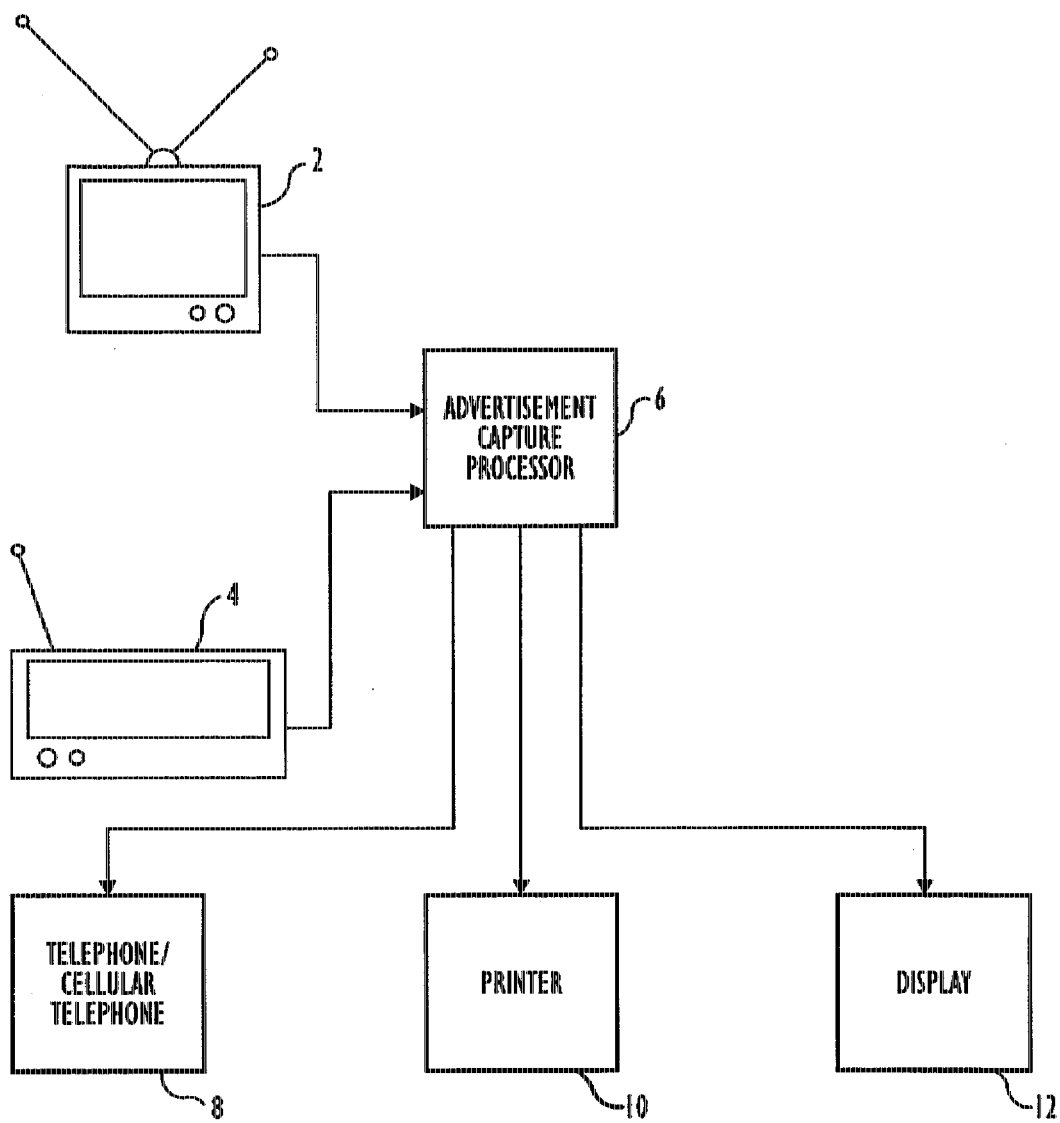
FIG. 1 is a basic block diagram of the computer architecture for the computer system enabling radio listeners and television viewers to obtain advertising information.

FIG. 1 is a basic block diagram of the computer architecture for the computer system used to enable radio listeners and television viewers to obtain advertising information. In FIG. 1, television 2 and/or radio set 4 receive information, including advertising information, and transmit same to advertisement capture processor 6. Advertisement capture processor 6 then analyses and strips the received data from television 2 and/or radio 4 and obtains the advertising information that has been pre-specified in accordance with a predetermined signal format.

Advertisement capture processor 6 then, upon the request of the user, selectively transmits the advertiser's telephone number to telephone or cellular telephone 8 to automatically call the advertiser of interest. Advertisement capture processor 6 alternatively or in combination with initiating a telephone call, transmits the advertising information to printer 10 and/or display 12 for review by the viewer and/or listener at a subsequent time.

Figure 2:
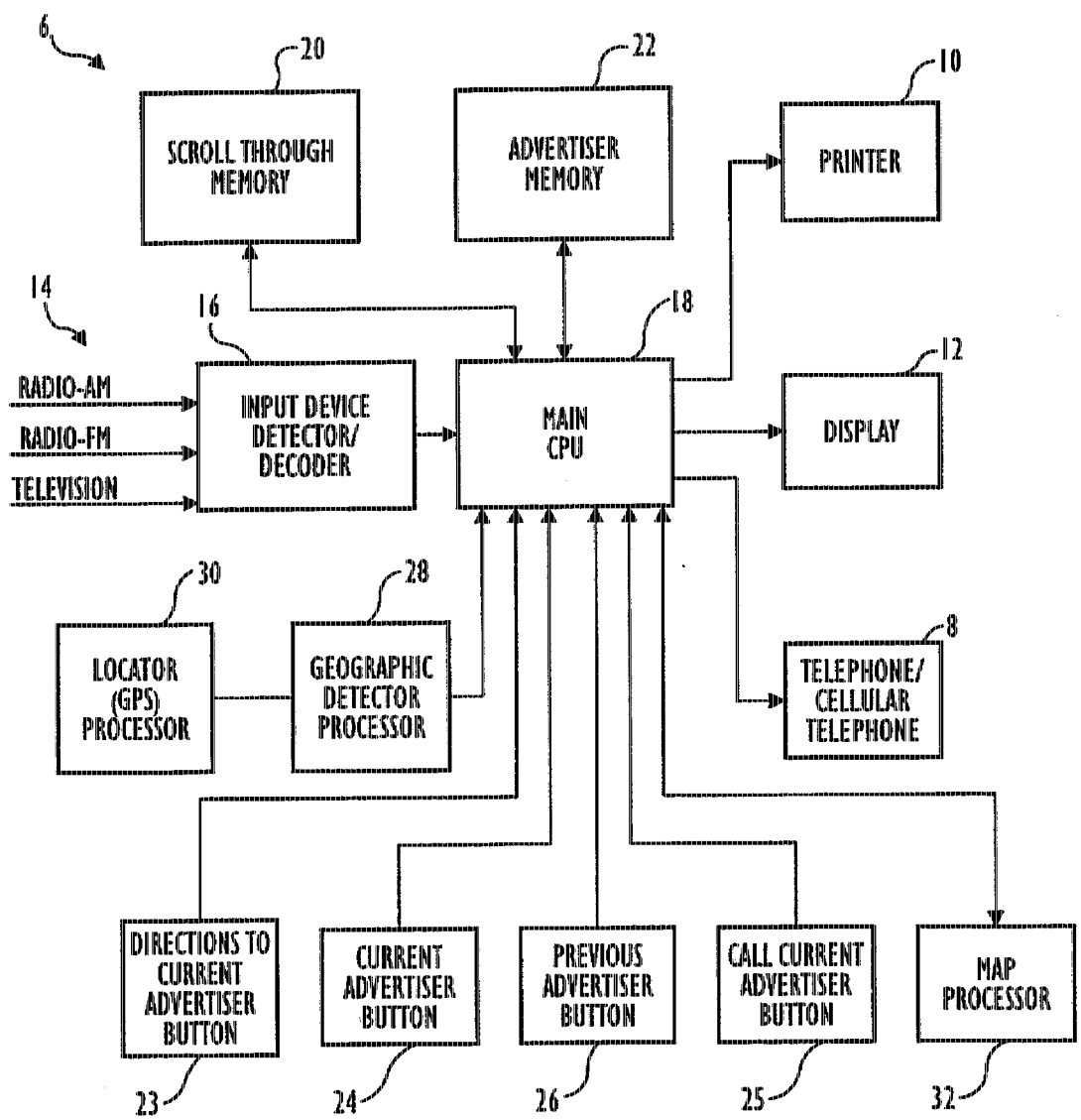
FIG. 2 is a detailed block diagram of the computer architecture for the computer system used to enable radio listeners and television viewers to obtain advertising information.

FIG. 2 is a detailed block diagram of the computer architecture for the computer system used to enable radio listeners and/or television viewers to obtain advertising information. In FIG. 2, input signals 14 are received by input device detector/decoder 16 of advertisement capture processor 6. Input device detector/decoder 16 then determines the type of the received signal, i.e., whether the signal is a radio AM signal, a radio FM signal or a television signal. After determining the specific type of the input signal, the input device detector/decoder 16 then analyzes the received signal for the advertising data embedded within the input signal.

For example, if the input signal is a radio AM signal, input device detector/decoder 16 analyzes the AM signal for embedded tones in the low frequency range. On the other hand, if the input signal is a radio FM signal, input device detector/decoder 16 analyzes the input signal for supra or super audible data carriers in the FM subcarrier channel. If the input signal is a television signal, device detector/decoder 16 analyzes the input signal for the vertical retrace interval for the additional data to be utilized in advertisement capture processor 6. Of course, other techniques can also be used to transmit advertising data concurrently or substantially concurrently with the video and/or audio data.

This device detector/decoder 16 then transmits the desired advertisement data to main central processing unit 18 for processing. Main central processing unit 18 then selectively formats and outputs the advertisement data upon the request of the user. Main central processing unit 18 utilizes scroll through memory 20 and advertiser memory 22 for displaying current, as well as previous, advertisements that have been received and processed by advertising capture processor 6.

For example, if the user activates the button/switch to obtain directions to the current advertiser 23, main central processing unit 18 receives the command and consults geographic detector processor 28 for the current position of the advertisement capture processor 6 and user associated therewith.

Geographic detector processor 28 in turn consults a standard global positioning system processor 30 to obtain the specific location of the user and transmits same to geographic detector processor 28. Geographic detector processor 28 then transmits the current position of the user to main central processing unit 18. Main central processing unit 18 then transmits the current position of the user, as well as the geographic location information, to map processor 32. Map processor 32 then utilizes standard maps in its data base to map a preferred route for travel by the user to the selected advertiser location.

If several advertisers sponsor a single advertisement, for example, if McDonalds in general provides an advertisement for all its stores in a particular geographic location, map processor 32 utilizes specific advertiser geographic information to determine the advertiser that is geographically preferred with respect to the current position of the user/computer system. The instructions may then be printed on printer 10 or displayed on display 12 for the convenience of the user.

In response to the activation of current advertiser button 24, main central processing unit 18 consults advertiser memory 22 to retrieve the current advertiser that has been captured by advertisement capture processor 6. Main central processing unit 18 then prints the current advertiser on printer 10 or displays the current advertiser on display 12.

In response to the activation of previous advertiser button 26, main central processing unit 18 consults scroll through memory 20 to obtain access to various previous advertiser messages. Main central processing unit 18 then prints the first previously requested advertiser message on printer 10 or displays the first previously received advertiser message on display 12.

When the call current advertiser switch/button 25 is activated, main central processing unit 18 then retrieves the current advertiser information from advertiser memory 22 which includes the telephone number of the current advertiser that has been selected. Main central processing unit 18 then automatically dials the current advertiser's telephone number via interaction with telephone/cellular telephone 8. The user is then automatically connected to the current advertiser for additional product/service inquiry and/or directions to the advertiser, and the like.

Figure 3:
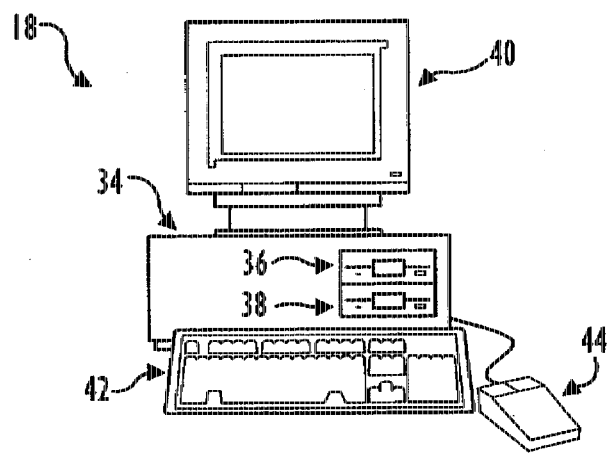
FIG. 3 is an illustration of a computer suitable for implementing the computer processes of the computer system.

FIG. 3 is an illustration of main central processing unit 18 for implementing the computer processing in accordance with the computer system for enabling radio listeners and television viewers to obtain advertising information. In FIG. 3, computer system 18 includes central processing unit 34 having disk drives 36 and 38. Disk drive indications 36 and 38 are merely symbolic of the number of disk drives which might be accommodated in this computer system. Typically, these would include a floppy disk drive such as 36, a hard disk drive (not shown either internally or externally) and a CD ROM indicated by slot 38. The number and type of drives varies, typically with different computer configurations. The computer includes display 40 upon which information is displayed. A keyboard 42 and a mouse 44 are typically also available as input devices via a standard interface. The computer illustrated in FIG. 3 may be, for example, a SPARC workstation from Sun Microsystems, Inc.

Figure 4:
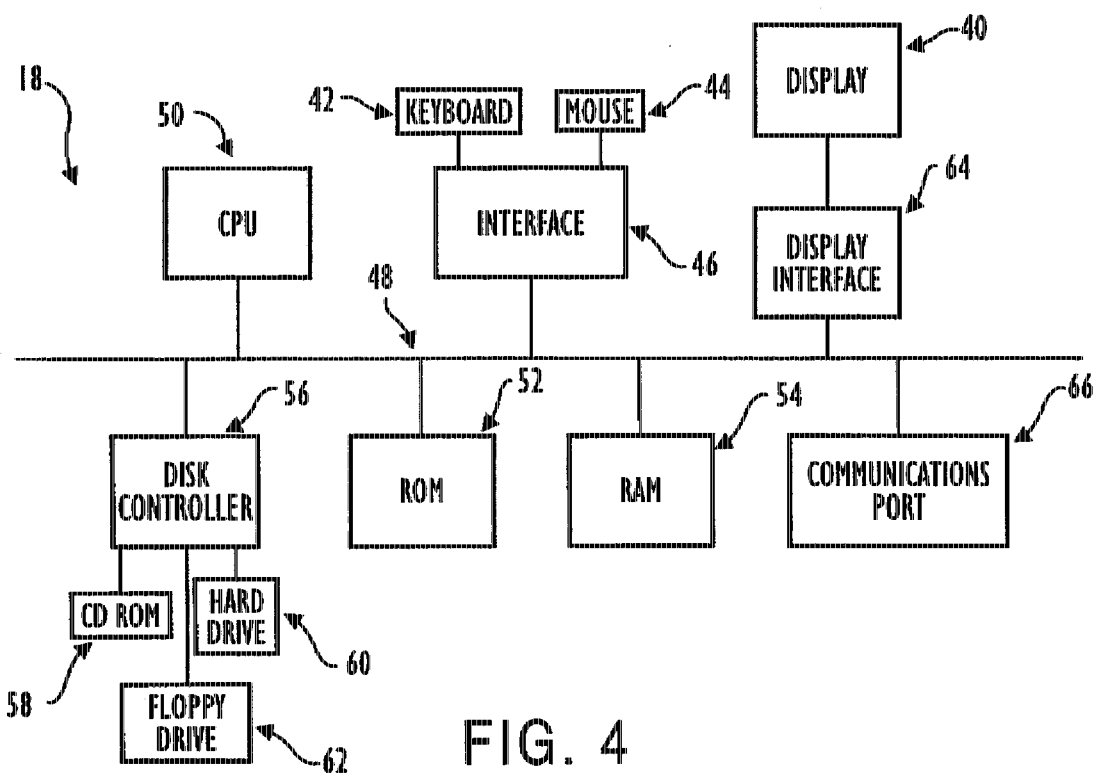
FIG. 4 is a block diagram of the computer illustrated in FIG. 3.

FIG. 4 is a block diagram of the internal hardware of the computer 18 illustrated in FIG. 3. As illustrated in FIG. 4, data bus 48 serves as the main information highway interconnecting the other components of the computer system. Interface 46 interfaces keyboard 42 and mouse 44 with bus 48. Central processing units (CPU) 50 is the central processing unit of the system performing calculations and logic operations required to execute a program. Read-only memory 52 and random access memory 54 constitute the main memory of the computer, and may be used to store the current as well as previous advertiser information as illustrated in memories 20 and 22 of FIG. 2.

Disk controller 56 interfaces one or more disk drives to the system bus 48. These disk drives may be floppy disk drives such as 62, internal or external hard drives such as 60, or CD ROM or DVD (digital video disks) drives such as 58. A display interface 64 interfaces with display 40 and permits information from the bus 48 to be displayed on the display 40. Communications with the external devices can occur on communications port 66.

Figure 5:
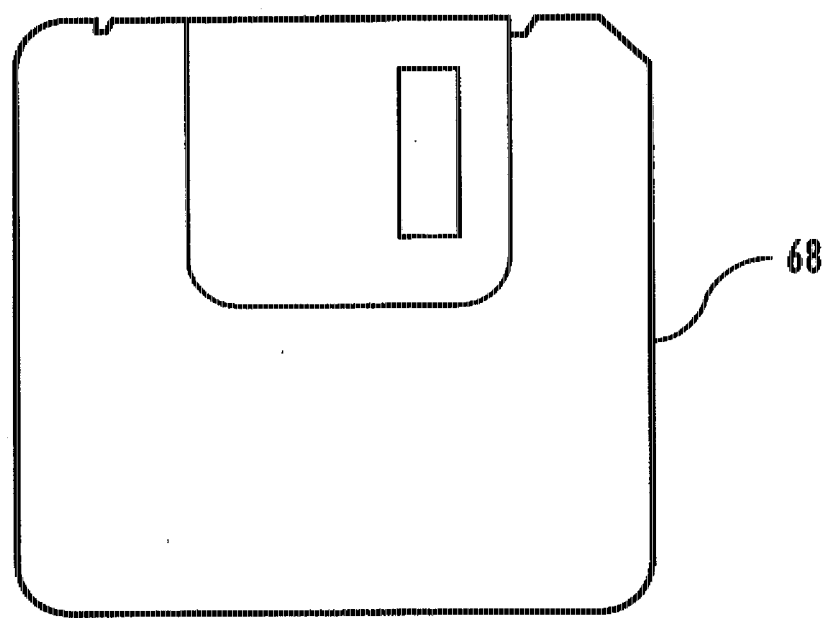
FIG. 5 is an illustration of a floppy disk containing a program having the computer instructions usable with the computer of FIG. 3 for implementing the processes described herein.
Figure 6:
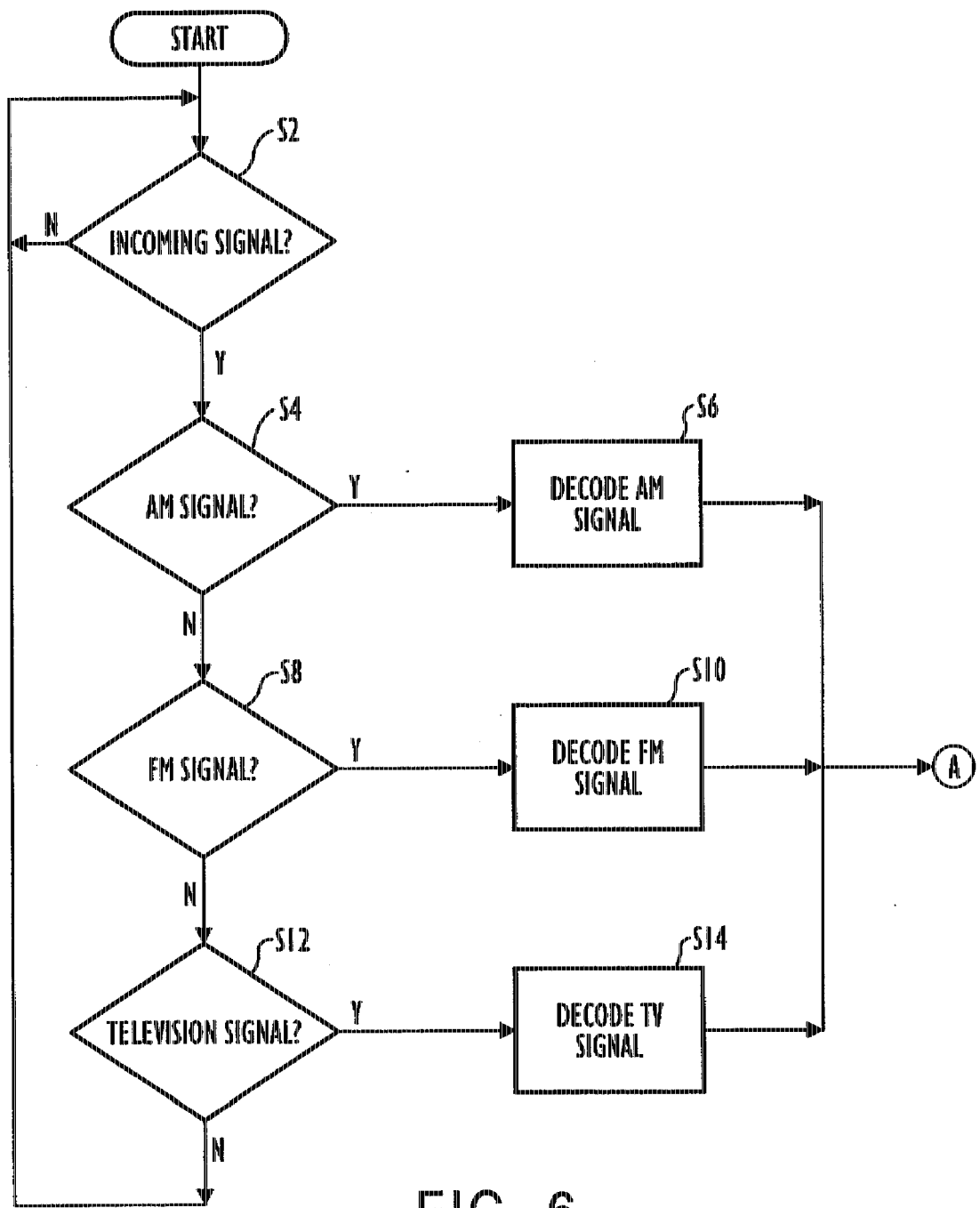
FIGS. 6–9 are flow charts illustrating the computer processes/instructions implemented by the computer architecture used to enable radio listeners and television viewers to obtain advertising information.
Figure 7:
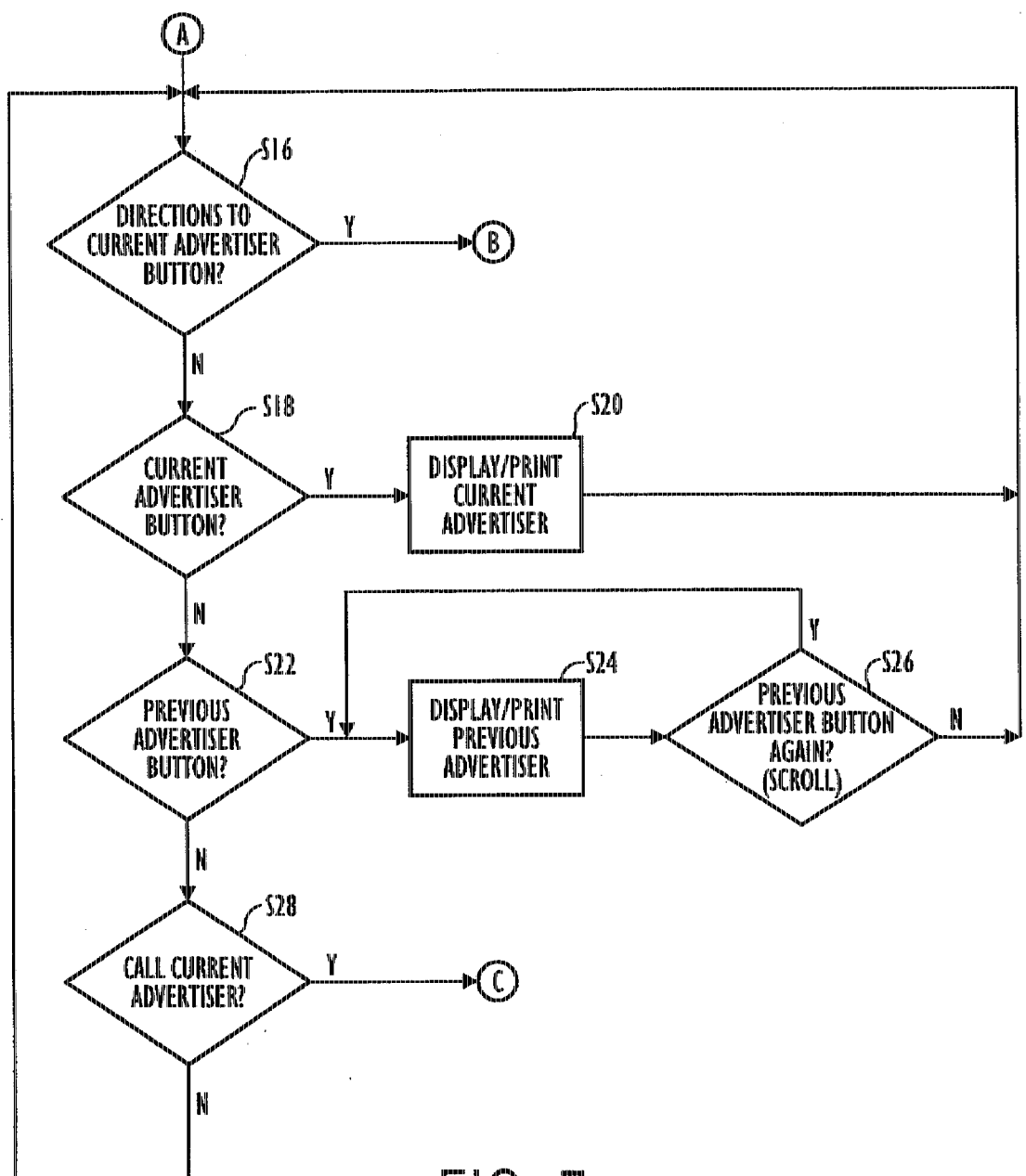
Figure 8:
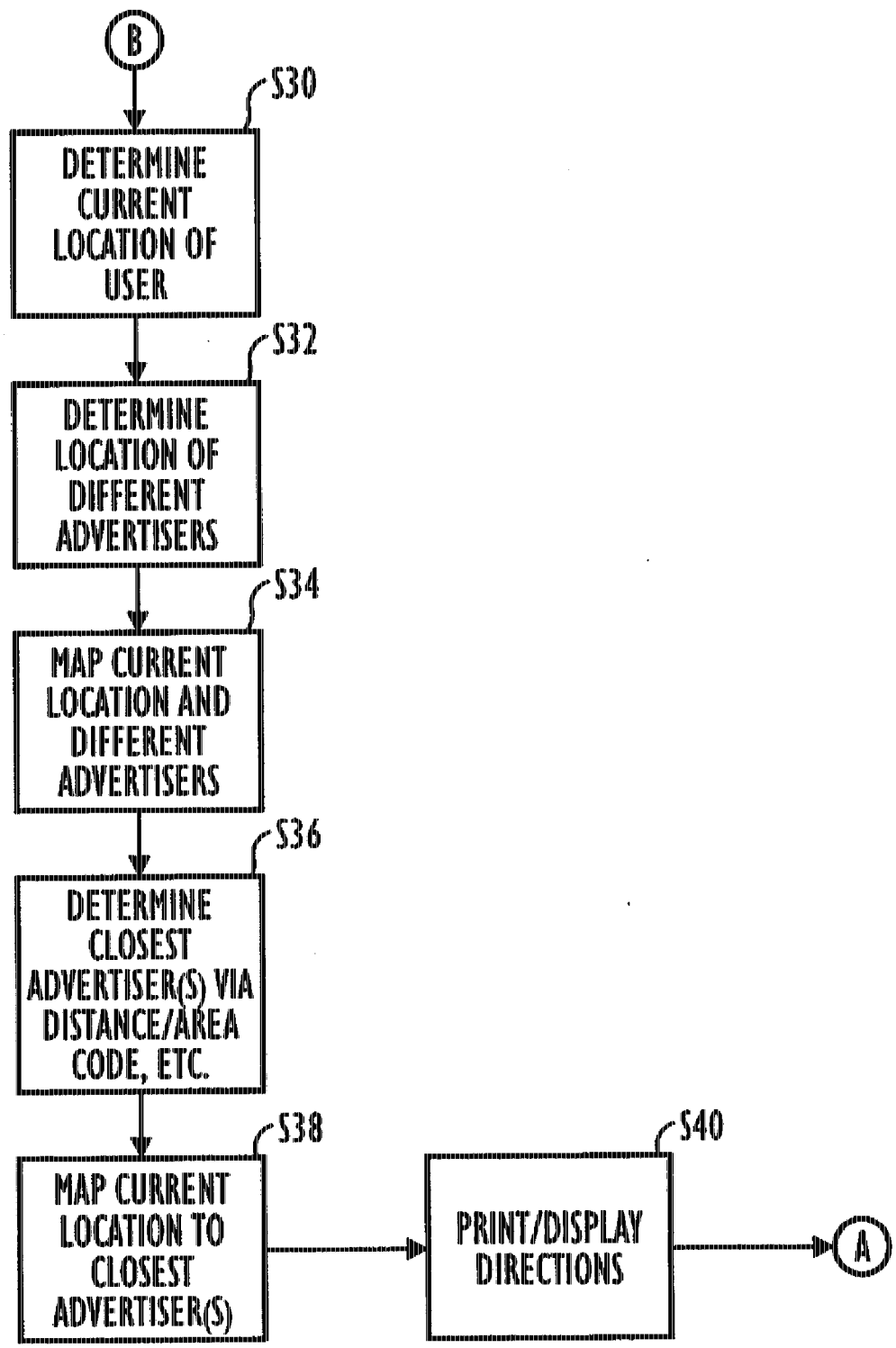
Figure 9:
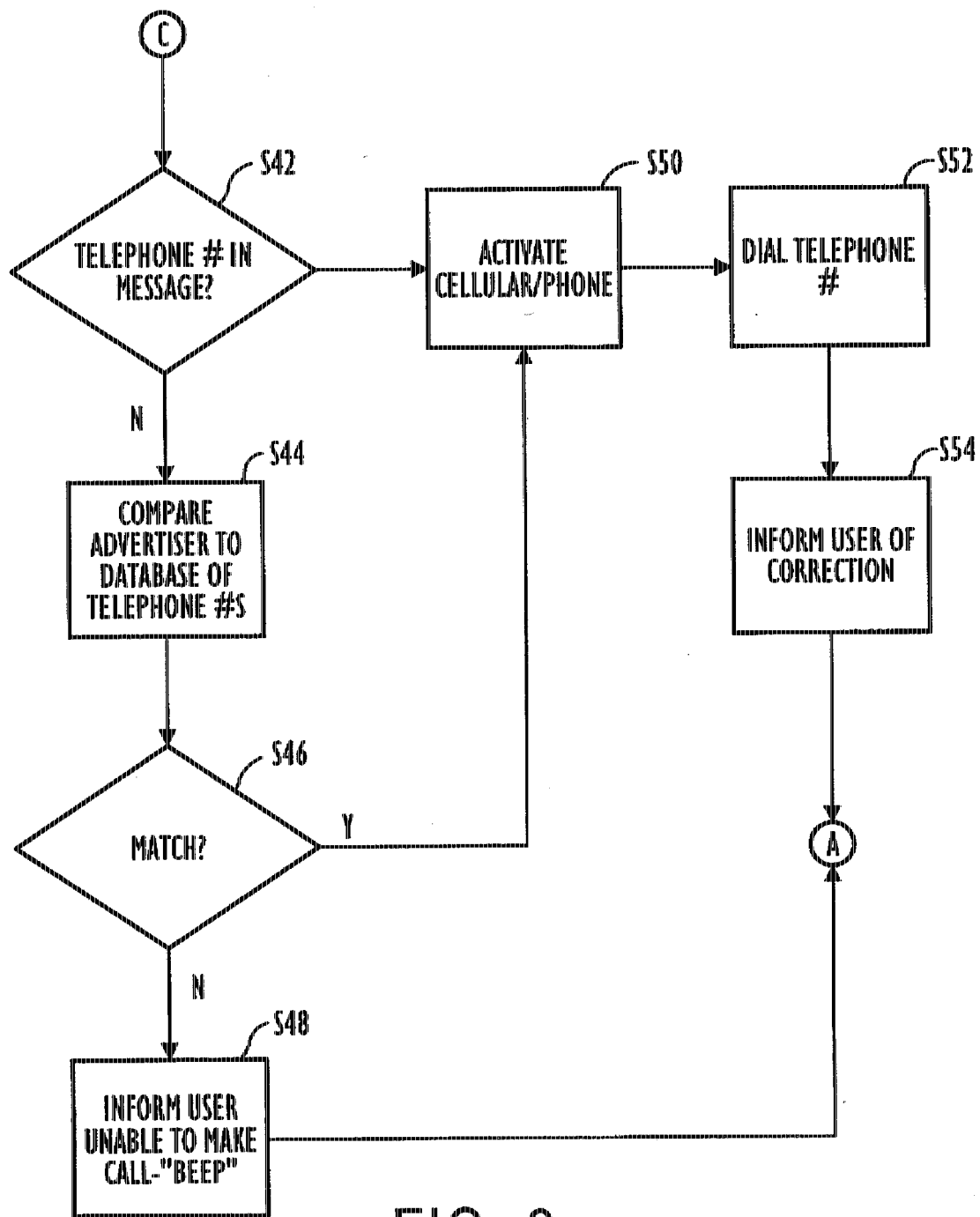

FIG. 5 is an illustration of an exemplary memory medium 68 which can be used with disk drives such as 62 in FIG. 4 or 36 in FIG. 3. Typically, memory media such as a floppy disk, or a CD ROM, or a digital video disk will contain, inter alia, the program information for controlling the computer to enable the computer to perform the testing and development functions in accordance with the computer system described herein.

FIGS. 6-9 are flow charts of the computer implemented process in accordance with the computer system described herein. The computer process begins by the monitoring of the incoming signal in Step S2 via the input device detector/decoder 16. If input device detector/decoder 16 determines that the incoming signal is an AM radio frequency signal in Step S4, then, input device detector/decoder 16 decodes the AM signal in step S6. If input device detector/decoder 16 determines that the incoming signal is not an AM signal, then the input device detector/decoder determines whether the incoming signal is an FM radio frequency signal in Step S8.

If the incoming signal is an FM signal, the input device detector/decoder 16 decodes the FM signal in Step S10. If the input device detector/decoder determines that the incoming signal is not an FM signal, then the input device detector/decoder 16 determines whether the incoming signal is a television type signal in Step S12, and if so, the input device detector/decoder 16 decodes the television signal in Step S14. If the input device detector/decoder 16 determines that the signal is not a television signal, then control is directed back to the beginning of the process to continue monitoring for the presence of the incoming signal by the input device detector/decoder 16.

After having detected and decoded the incoming signal, main central processing unit 18 continuously monitors for the presence of a user request to the advertisement capture processor 6 for the capturing of advertisement information to be subsequently utilized by the user. Thus, the main central processing unit 18 monitors whether the user has activated the directions to current advertiser button/switch 23 in Step S16. If the user has not activated the directions to current advertiser button 23, the main central processing unit 18 further monitors whether the user has activated the current advertiser button 24 in Step S18.

If the user has activated the current advertiser button 24, the main central processing unit displays and/or prints the current advertiser on display 12 and/or printer 10 in Step S20. If the current advertiser button has not been activated by the user, the main central processing unit then determines whether the previous advertiser button 26 has been activated by the user in Step S22. If the previous advertiser button 26 has been activated, the main central processing unit then displays and/or prints the previous advertiser information in Step S24 on display 12 and/or printer 10. The main central processing unit 18 next determines whether the user has again activated the previous advertiser button 26 in Step S26, and if so, again displays and/or prints the previous advertiser information in Step S24.

If the previous advertiser button 26 has not been activated in Step S22, the main central processing unit 18 then determines whether the call current advertiser button 25 has been activated in Step S28. If the call current advertiser button 25 has not been activated, then the main central processing unit again monitors whether the directions to current advertiser button 23 has been activated in Step S16.

If the directions to current advertiser button 23 has been activated in Step S16, then main central processing unit 18 determines the current location of the user in Step S30 by interaction with geographic detector processor 28 and locator processor 30. Main central processing unit 18 then determines the location of the advertiser or a plurality of advertisers in Step S32 by accessing the advertiser information in advertiser memory 22.

Main central processing unit 18 then maps the current location of the user with the different advertisers in Step S34 by consulting and/or interaction with map processor 32 which has access to a variety of geographic/map databases for this function. Map processor 32 then determines the closest advertiser or group of advertisers using predetermined criteria, such as distance, area code, convenience of available roads, and the like, in Step S36. Map processor 32 then maps the current location of the user to the closest advertiser in Step S38, and the prints and/or displays the directions to the selected advertiser in Step S40 on printer and/or display 12. Main central processing unit 18 then continues to monitor for the user request via the activation of buttons 23-26.

If the user has activated the call current advertiser button 25 in Step S28, then the main central processing unit determines whether the telephone number of the current advertiser has been inserted in the incoming message in Step S42. If the main central processing unit 18 is not able to detect the telephone number in the incoming message, then main central processing unit 18 compares received advertiser information to advertiser information stored in advertiser memory 22 in Step S44 to determine whether it may access the advertiser's telephone number in its own database. If the central processing unit 18 is not able to determine or obtain the advertiser's telephone number in step S46, main central processing unit 18 informs the user that it is unable to make the call of some type of audible or visual message in Step S48.

If, however, the telephone number is present in the incoming message or main central processing unit 18 is able to obtain the advertiser's telephone number from its own advertiser memory 22, then main central processing unit 18 activates the auxiliary telephone or cellular telephone 8 in Step S50. Main central processing unit 18 next transmits the required digits to dial the advertiser telephone number in Step S52 to the auxiliary telephone or cellular telephone 8. Central processing unit 18 then arranges so that the user is informed of the telephone connection to the advertiser in Step S54 by either itself informing the user or controlling the auxiliary telephone or cellular telephone 8 to inform the user of same.

Thus, in accordance with the computer system that enables radio listeners and television viewers to obtain advertising information, users or listeners are able to obtain advertising information to be used at a later time. In addition, advertisers are also able to concentrate on the aspects of the message which provide a more successful response while transmitting any regulatory or other information that might be required to the viewer or listener via the advertisement capture processor 6. Further, for the convenience of the viewer and/or listener, specific features are provided, such as printing or displaying the advertisement information, determining the geographically preferred advertiser, providing directions to the selected advertiser, as well as providing voice connection to the selected advertiser. These specific features will permit mobile listeners and/or viewers to concentrate on their mobile activities while being able to still receive this information and consider same at a later time.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. A computer implemented method, comprising the steps of:
   (a) receiving an incoming video or audio signal;
   (b) determining whether the incoming video or audio signal includes advertisement specific data of an advertiser;
   (c) capturing and storing the advertiser specific data determined in said step (b); and
   (d) selectively performing, responsive to the request of a user, at least one of the following steps:
      (d1) printing the advertiser specific data including current and previous advertiser specific data upon request;
      (d2) displaying the advertiser specific data including current and previous advertiser specific data upon request;
      (d3) obtaining an advertiser destination number from the advertiser specific data and automatically attempting to establish voice connection with the advertiser upon request;
      (d4) providing directions to an advertiser location; and
      (d5) determining a geographically preferred advertiser.

2. A computer implemented method according to claim 1, wherein said step (b) further comprises the steps of:
   (b1) determining whether the incoming video or audio signal comprises an amplitude modulated (AM) signal, a frequency modulated (FM) signal or a television signal;
   (b2) responsive to said step (b1), performing at least one of the following steps:
      (b2-1) determining whether the AM signal includes the advertisement specific data of the advertiser by analyzing embedded tones in low frequency component of the AM signal;
      (b2-2) determining whether the FM signal includes the advertisement specific data of the advertiser by analyzing supra or super audible data carriers in the FM subcarrier channel of the FM signal; and
      (b2-3) determining whether the television signal includes the advertisement specific data of the advertiser by analyzing a vertical retrace interval of the television signal.

3. A computer implemented method according to claim 1, wherein said step (d4) further includes the steps of:
   (d4-1) identifying the advertiser from the advertiser specific data;
   (d4-2) obtaining the advertiser location from the advertiser specific data or an auxiliary advertiser database;
   (d4-3) obtaining a current location of the user utilizing a global positioning system;
   (d4-4) mapping the current location of the user with the advertiser location;
   (d4-5) determining a travel route from the current location of the user to the advertiser location;
   (d4-6) at least one of displaying and printing the travel route to the advertiser location.

4. A computer implemented method according to claim 1, wherein said step (d5) further includes the steps of:
   (d5-1) identifying a plurality of advertisers from the advertiser specific data;
   (d5-2) obtaining advertiser locations of the plurality of advertisers from the advertiser specific data or an auxiliary advertiser database;
   (d5-3) obtaining a current location of the user utilizing a global positioning system;
   (d5-4) mapping the current location of the user with the advertiser locations;
   (d5-5) determining the geographically preferred advertiser responsive to said mapping step (d5-4); and
   (d5-6) at least one of displaying and printing the geographically preferred advertiser.

5. A computer system, comprising:
   an input device detector and decoder processor, receiving an incoming video or audio signal, and determining whether the incoming video or audio signal includes advertisement specific data of an advertiser;
   a data processor, operatively coupled to said input device detector and decoder processor, said data processor capturing and storing the advertiser specific data;
   a printer connected to said data processor;
   a display connected to said data processor;
   a user positioning system connected to said data processor; and
   a telephone connected to said data processor,
   wherein said data processor selectively performing, responsive to the request of a user, at least one of the following functions:
      (1) printing the advertiser specific data on said printer including current and previous advertiser specific data upon request;
      (2) displaying the advertiser specific data on said display including current and previous advertiser specific data upon request;
      (3) obtaining an advertiser destination number from the advertiser specific data and automatically attempting to establish voice connection with the advertiser upon request using said telephone;

(4) providing directions to an advertiser location by performing the following functions:
- (4-1) identifying the advertiser from the advertiser specific data;
- (4-2) obtaining the advertiser location from the advertiser specific data or an auxiliary advertiser database;
- (4-3) obtaining a current location of the user utilizing said user positioning system;
- (4-4) mapping the current location of the user with the advertiser location;
- (4-5) determining a travel route from the current location of the user to the advertiser location;
- (4-6) at least one of displaying on said display and printing on said printer the travel route to the advertiser location;

(5) determining a geographically preferred advertiser by performing the following functions:
- (5-1) identifying a plurality of advertisers from the advertiser specific data;
- (5-2) obtaining advertiser locations of the plurality of advertisers from the advertiser specific data or an auxiliary advertiser database;
- (5-3) obtaining a current location of the user utilizing said user positioning system;
- (5-4) mapping the current location of the user with the advertiser locations;
- (5-5) determining the geographically preferred advertiser responsive to said mapping function (5-4);
- (5-6) at least one of displaying on said display and printing on said printer the geographically preferred advertiser.

6. A computer system according to claim 5, wherein said input device detector and decoder processor determines whether the incoming video or audio signal includes advertisement specific data of an advertiser by performing the following functions:
(1) determining whether the incoming video or audio signal comprises an amplitude modulated (AM) signal, a frequency modulated (FM) signal or a television signal;
(2) responsive to said function (1), performing at least one of the following functions:
- (2-1) determining whether the AM signal includes the advertisement specific data of the advertiser by analyzing embedded tones in low frequency component of the AM signal;
- (2-2) determining whether the FM signal includes the advertisement specific data of the advertiser by analyzing supra or super audible data carriers in the FM subcarrier channel of the FM signal; and
- (2-3) determining whether the television signal includes the advertisement specific data of the advertiser by analyzing a vertical retrace interval of the television signal.

7. A computer readable tangible medium storing instructions for implementing a process driven by a computer, the instructions instructing the computer to perform the process of capturing advertiser information received from an audio or video signal, said computer readable tangible medium storing instructions instructing the computer to implement the following:
(a) receiving an incoming video or audio signal;
(b) determining whether the incoming video or audio signal includes advertisement specific data of an advertiser;
(c) capturing and storing the advertiser specific data determined in said determining (b); and
(d) selectively performing, responsive to the request of a user, at least one of the following steps:
- (d1) printing the advertiser specific data including current and previous advertiser specific data upon request;
- (d2) displaying the advertiser specific data including current and previous advertiser specific data upon request;
- (d3) obtaining an advertiser destination number from the advertiser specific data and automatically attempting to establish voice connection with the advertiser upon request;
- (d4) providing directions to an advertiser location, said step (d4) including the steps of:
  - (d4-1) identifying the advertiser from the advertiser specific data;
  - (d4-2) obtaining the advertiser location from the advertiser specific data or an auxiliary advertiser database;
  - (d4-3) obtaining a current location of the user utilizing a global positioning system;
  - (d4-4) mapping the current location of the user with the advertiser location;
  - (d4-5) determining a travel route from the current location of the user to the advertiser location;
  - (d4-6) at least one of displaying and printing the travel route to the advertiser location;
- (d5) determining a geographically preferred advertiser, said step (d5) including the steps of:
  - (d5-1) identifying a plurality of advertisers from the advertiser specific data;
  - (d5-2) obtaining advertiser locations of the plurality of advertisers from the advertiser specific data or an auxiliary advertiser database;
  - (d5-3) obtaining another current location of the user utilizing the global positioning system;
  - (d5-4) mapping another current location of the user with the advertiser locations;
  - (d5-5) determining the geographically preferred advertiser responsive to said mapping step (d5-4);
  - (d5-6) at least one of displaying and printing the geographically preferred advertiser.

8. A computer readable tangible medium storing instructions according to claim 7, wherein said determining (b) further comprises the steps of:
(b1) determining whether the incoming video or audio signal comprises an amplitude modulated (AM) signal, a frequency modulated (FM) signal or a television signal;
(b2) responsive to said step (b1), performing at least one of the following steps:
- (b2-1) determining whether the AM signal includes the advertisement specific data of the advertiser by analyzing embedded tones in low frequency component of the AM signal;
- (b2-2) determining whether the FM signal includes the advertisement specific data of the advertiser by analyzing supra or super audible data carriers in the FM subcarrier channel of the FM signal; and
- (b2-3) determining whether the television signal includes the advertisement specific data of the advertiser by analyzing a vertical retrace interval of the television signal.

9. In a computer system including an input device detector and decoder processor receiving an incoming video or audio signal, and determining whether the incoming video or audio signal includes advertisement specific data of an advertiser, a data processor operatively coupled to said input device detector and decoder processor, said data processor capturing and storing the advertiser specific data, a printer or a display connected to said data processor, a computer implemented method, comprising the steps of:

(a) receiving the incoming video or audio signal;

(b) determining whether the incoming video or audio signal includes the advertisement specific data of the advertiser by performing at least one of the following steps:

(b1) determining whether the incoming video or audio signal comprises an amplitude modulated (AM) signal, a frequency modulated (FM) signal or a television signal;

(b2) responsive to said step (b1), performing at least one of the following steps:

(b2-1) determining whether the AM signal includes the advertisement specific data of the advertiser by analyzing embedded tones in low frequency component of the AM Signal;

(b2-2) determining whether the FM signal includes the advertisement specific data of the advertiser by analyzing supra or super audible data carriers in the FM subcarrier channel of the FM signal;

(b2-3) determining whether the television signal includes the advertisement specific data of the advertiser by analyzing a vertical retrace interval of the television signal;

(c) capturing and storing the advertiser specific data determined in said step (b); and (d) selectively performing, responsive to the request of a user, at least one of the following steps:

(d1) printing the advertiser specific data including current and previous advertiser specific data upon request;

(d2) displaying the advertiser specific data including current and previous advertiser specific data upon request.

10. A communication system, comprising:

an advertising broadcasting device broadcasting advertisement specific data of an advertiser in a broadcast signal;

an advertising receiving device receiving the broadcast signal from said advertising broadcasting device;

an input device detector and decoder processor, receiving the broadcast signal from said advertising receiving device as an incoming video or audio signal, and determining whether the incoming video or audio signal includes the advertisement specific data of the advertiser;

a data processor, operatively coupled to said input device detector and decoder processor, said data processor capturing and storing the advertiser specific data;

a printer connected to said data processor;

a display connected to said data processor;

a user positioning system connected to said data processor; and a telephone connected to said data processor, wherein said data processor selectively performing, responsive to the request of a user, at least one of the following functions:

(1) printing the advertiser specific data on said printer including current and previous advertiser specific data upon request;

(2) displaying the advertiser specific data on said display including current and previous advertiser specific data upon request;

(3) obtaining an advertiser destination number from the advertiser specific data and automatically attempting to establish voice connection with the advertiser upon request using said telephone;

(4) providing directions to an advertiser location; and (5) determining a geographically preferred advertiser.

11. A communication system according to claim 10, wherein said input device detector and decoder processor determines whether the incoming video or audio signal includes the advertisement specific data of the advertiser by performing the following functions:

(1) determining whether the incoming video or audio signal comprises an amplitude modulated (AM) signal, a frequency modulated (FM) signal or a television signal;

(2) responsive to said function (1), performing at least one of the following functions:

(2-1) determining whether the AM signal includes the advertisement specific data of the advertiser by analyzing embedded tones in low frequency component of the AM signal;

(2-2) determining whether the FM signal includes the advertisement specific data of the advertiser by analyzing supra or super audible data carriers in the FM subcarrier channel of the FM signal; and (2-3) determining whether the television signal includes the advertisement specific data of the advertiser by analyzing a vertical retrace interval of the television signal.

12. A communication system according to claim 10, wherein said advertising receiving device comprises at least one of a television, an FM radio or an AM radio.

* * * * *